No. 655,338. Patented Aug. 7, 1900.
D. GALE.
APPARATUS FOR SEPARATING SOLID BODIES FROM LIQUIDS.
(Application filed Apr. 11, 1898.)
(No Model.) 2 Sheets—Sheet 1.
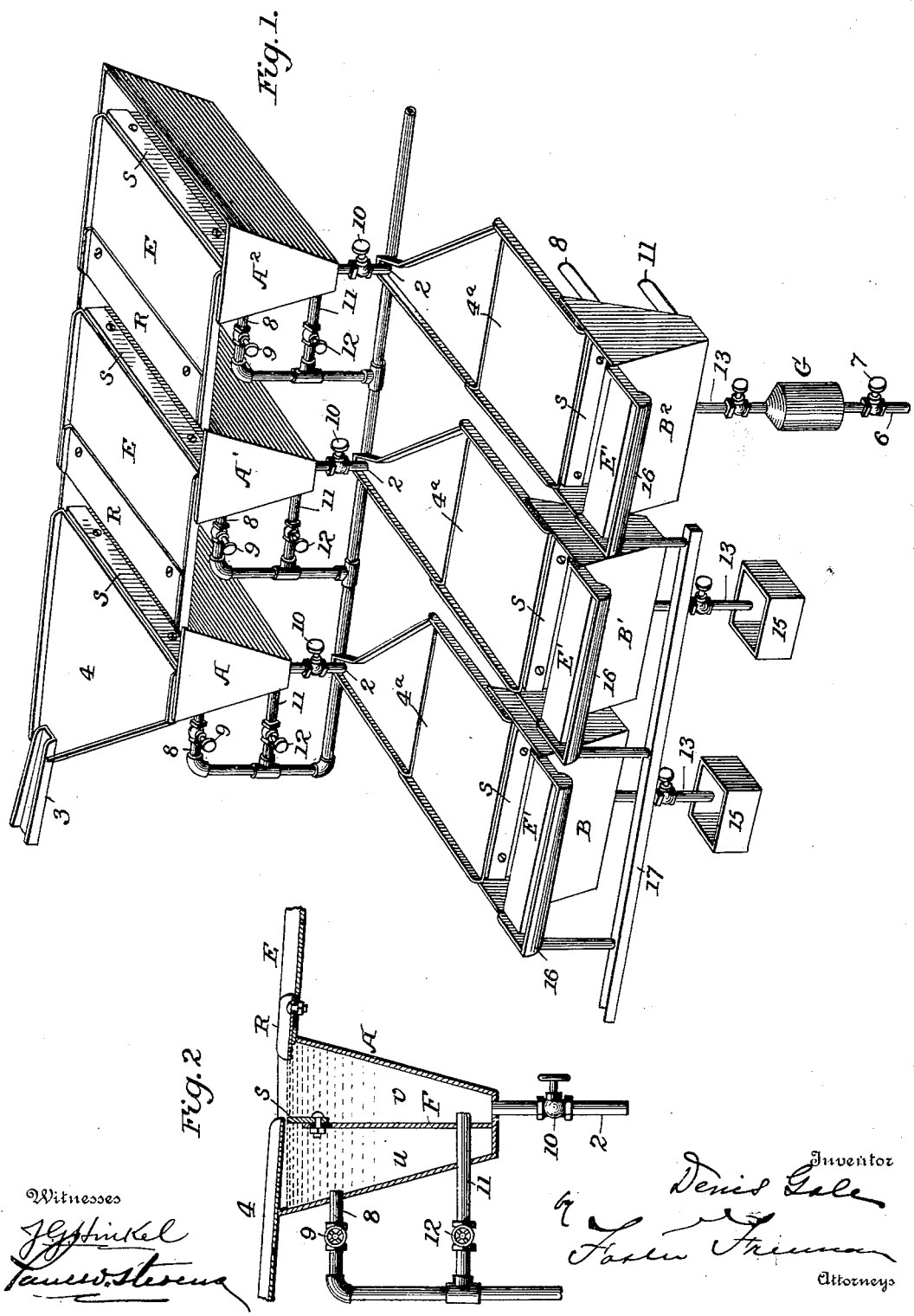

No. 655,338. Patented Aug. 7, 1900.
D. GALE.
APPARATUS FOR SEPARATING SOLID BODIES FROM LIQUIDS.
(Application filed Apr. 11, 1898.)
(No Model.) 2 Sheets—Sheet 2.

THE NORRIS PETERS CO., PHOTO-LITHO., WASHINGTON, D. C.

UNITED STATES PATENT OFFICE.

DENIS GALE, OF DENVER, COLORADO.

APPARATUS FOR SEPARATING SOLID BODIES FROM LIQUIDS.

SPECIFICATION forming part of Letters Patent No. 655,338, dated August 7, 1900.

Application filed April 11, 1898. Serial No. 677,242. (No model.)

*To all whom it may concern:*

Be it known that I, DENIS GALE, a citizen of the United States, residing at Denver, in the county of Arapahoe and State of Colorado, have invented certain new and useful Improvements in Apparatus for Separating Solid Bodies from Liquids, of which the following is a specification.

My invention has for its object to separate the solid from the liquid portions of such mixtures as pass from stamp-mills or however such mixtures may be formed; and my invention consists in means for directing the mixture in a thin stream over one or more comparatively-stationary bodies of water, preferably successively over different bodies, and also in securing a regular inflow and discharge of each body of water and in means for securing such results as fully set forth hereinafter and as illustrated in the accompanying drawings, in which—

Figure 3:
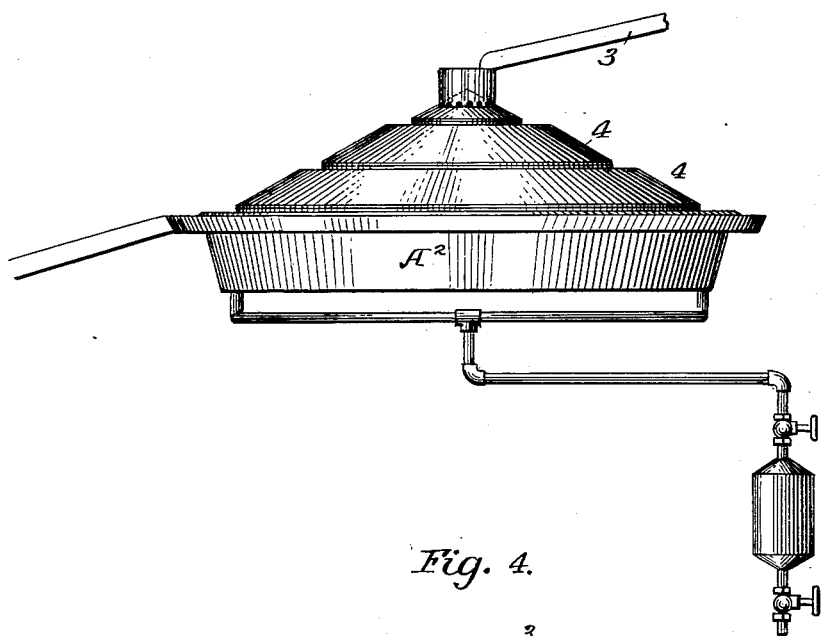
Figure 4:
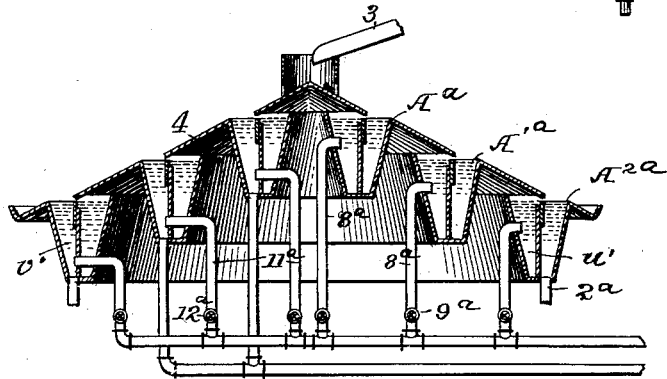

Figure 1 is a perspective view of an apparatus whereby to carry out my process; Fig. 2, an enlarged section of one of the separators; Fig. 3, a view illustrating a modified form of apparatus; Fig. 4, a section of Fig. 3.

In carrying out my mode of operation, although various different arrangements of vessels may be employed, I have illustrated in Figs. 1 and 2 one which is effective and in which there may be one, two, or more separators A, each of which consists of a vessel narrowing toward the bottom and with a central partition F less in height than the sides of the vessel, with a slide $s$, which may be adjusted to any desired extent vertically. Water is admitted into the chamber $u$ on one side of the partition F through a pipe 8, provided with a cock 9 and preferably arranged near the top, and water is admitted to the chamber $v$ on the opposite side of the partition F, preferably near the bottom, through a pipe 11, provided with a cock 12. A discharge-pipe 2 leads from the chamber $v$ and is provided with a cock 10. A table 4, having side flanges, extends over the chamber $u$ and over the partition F, and another table E extends from the side of the vessel A across the top of the chamber $u$ of the next vessel A, as shown. There is an adjustable slide R, which rests upon the table E and which can be moved back so as partially to cover the chamber $v$. The material from the stamps or other apparatus, consisting of liquid with the material to be separated in suspension, is conducted through a spout or trough 3 to the table 4 of the first separator vessel A. Water is also permitted to flow through the pipe 8, regulated by the cock 9, into the chamber $u$, and from thence it flows in a thin stream the width of the vessel over the surface of the chamber $v$ toward the table E. Inasmuch, however, as there is a discharge of the contents of the chamber $v$ through the pipe 2 and as it is desirable to keep the surface of the water in the chamber $v$ at practically a uniform height, water is admitted into the chamber $v$ through the pipe 11, regulated by the cock 12, so that there is always a constant height of water in the chamber $v$, a constant flow across the surface of the chamber $v$ toward the table E, and a constant discharge through the pipe 2. As the material from the spout 3 passes over the table 4 the particles of greater gravity and smaller size will either remain or travel thereon gradually over the table, and, finally, on reaching the water in the chamber $v$ will sink therein. At the same time the particles of less gravity and larger size will be carried so quickly as to move under momentum across the surface of the water in the chamber $v$ and will be discharged onto the table E and pass onward.

When the current from the table 4, holding matter in suspension, passes from the edge of the table onto the surface of the water in the chamber $v$, it meets an upper surface current in the said chamber flowing onward toward and onto the top of the table E over the slide R, and it will be evident that by means of regulating the flow through the trough 3 and that through the pipes 8 and 11 the flow of the current may be so regulated that there will be no tendency to unduly agitate the thin film or stream which flows onward from the table 4 toward the table E, and therefore as the material in suspension passes over the surface of the water in the chamber $v$ any smaller particles which are of sufficient weight or gravity will have an opportunity to fall downward through the chamber $v$ toward the bottom thereof and be discharged through the pipe 2, while the other and larger and lighter particles will be carried onward and over the slide R and table E toward the second separator A', passing over the chamber $u$ and on to the flowing current or stream at the top of the water in the chamber $v$ of the second separator, where time will be allowed for the settlement of any of the particles which fail to be separated in the first separator, and so on, over any desired number of separators until the last separator $A^2$ is reached, when all of the material will have been deposited in the said separators.

From each of the separators A A' the material flows through the pipe 2 onto an inclined table $4^a$, and thence to another vessel B, precisely like the vessel of the separator A and into the chambers of which water is directed through pipes 8 and 11 the same as into the separators A, and from the table E' of each vessel B the overflow passes into a waste-trough 16, and thence into a discharge-conduit 17, receiving the overflow from all of the vessels B B' B². The separated material in the chamber $v$ of each vessel B passes downward through a pipe 13 into a receptacle 15.

The receptacle B² receives the material from the final separator A², and with the discharge-pipe 13 of the vessel B² communicates a receptacle G, from which extends a pipe 6. The pipes 2 and 6 are provided with cocks 10 and 7, so that by closing the cock 10 the receptacle G may be opened and cleansed.

While it will be evident that all of the vessels A A' A² B B' B², &c., are substantially alike, it will of course be evident that the cocks are so turned and the parts are so adjusted that the action upon the material will be a progressive one. For instance, there may be a greater amount of current on the surface of the first vessel than on those of the last of the series. So also the slides R may be set so as to restrict the surface area to a greater extent in the first vessels than in the last of the series, and otherwise the adjustments of the parts may be varied according to the circumstances of the case, so that there will be a gradual elimination, first of the coarser and then of the finer valuable particles that are carried by the current. The character and extent of these adjustments of course will depend to a very great degree upon the character of the material operated upon.

While I have shown the vessels A B, &c., as practically rectangular in cross-sectional form, they may be circular, as shown in Fig. 3, the material gradually progressing from the central circular vessel outward over circular inclined tables $4^a$ with chamber $v'$ below with the same effect as when vessels of different shapes are employed. While I have referred to grains or particles of different sizes, it will be understood that the material treated consists of extremely-fine particles, such as are difficult to separate and are apt to remain in suspension in the liquid, and that the tables 4 may be almost level or but slightly inclined, so that the particles have abundant time to separate and pass slowly onward. I therefore do not limit myself to the shapes of the different vessels nor to any specific adjustment of the parts or any special regulation of the current-flow.

Without limiting myself to the precise construction and operation of parts shown, I claim as my invention—

1. In a separating apparatus, the combination with a vessel, consisting of two chambers, means for causing water in one chamber to flow in a thin sheet over the surface of water in the second chamber, a conduit with a flat bottom communicating with the surface of the water in the second chamber, and a slide adjustable over the surface of the water in the second chamber, substantially as described.

2. In a separating apparatus, the combination with a vessel, consisting of two chambers, adjustable means for causing water in one chamber to flow in a thin sheet over water in the second chamber, a conduit with a flat bottom communicating with the surface of the water in the second chamber, a slide adjustable over the surface of the water in the second chamber, and an inlet and an outlet pipe for the second chamber adapted to maintain a uniform level therein, substantially as described.

In testimony whereof I have signed my name to this specification in the presence of two subscribing witnesses.

DENIS GALE.

Witnesses:
LLOYD JONES,
H. L. RITTER.